United States Patent
Kotikalapudi

(10) Patent No.: US 11,210,116 B2
(45) Date of Patent: Dec. 28, 2021

(54) SYSTEM, METHOD AND COMPUTER PROGRAM PRODUCT OF NAVIGATING USERS THROUGH A COMPLEX COMPUTING SYSTEM TO PERFORM A TASK

(71) Applicant: ADP, LLC, Roseland, NJ (US)

(72) Inventor: Prabhakar Kotikalapudi, Hyderabad (IN)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/521,360

(22) Filed: Jul. 24, 2019

(65) Prior Publication Data
US 2021/0026662 A1    Jan. 28, 2021

(51) Int. Cl.
*G06F 9/451*     (2018.01)
*G06F 3/0482*    (2013.01)
*G06N 20/00*     (2019.01)

(52) U.S. Cl.
CPC ............ *G06F 9/453* (2018.02); *G06F 3/0482* (2013.01); *G06N 20/00* (2019.01)

(58) Field of Classification Search
CPC ........ G06F 9/453; G06F 3/0482; G06N 20/00
See application file for complete search history.

(56) References Cited

U.S. PATENT DOCUMENTS

| | | | | |
|---|---|---|---|---|
| 8,972,325 | B2 * | 3/2015 | Varghese | G06Q 30/02 706/47 |
| 9,432,354 | B2 * | 8/2016 | Wadhwa | H04L 63/105 |
| 10,305,758 | B1 * | 5/2019 | Bhide | H04L 41/22 |
| 10,474,329 | B2 * | 11/2019 | Yamashita | G06F 3/0482 |
| 10,585,681 | B2 * | 3/2020 | Bhamidipati | H04L 67/306 |
| 10,783,210 | B1 * | 9/2020 | Dhillon | G06F 16/958 |
| 2004/0002887 | A1 * | 1/2004 | Fliess | G06Q 10/10 705/7.14 |
| 2005/0118996 | A1 * | 6/2005 | Lee | H04M 1/72472 455/425 |
| 2007/0061701 | A1 * | 3/2007 | Thieberger | G06Q 10/10 715/236 |

(Continued)

OTHER PUBLICATIONS

Davison et al., "Predicting Sequences of User Actions," AAAI Technical Report WS-98-07, 1998, American Association for Artificial Intelligence, 8 pages.

(Continued)

*Primary Examiner* — Daeho D Song
(74) *Attorney, Agent, or Firm* — Yee & Associates, P.C.

(57) ABSTRACT

A computer-implemented method, system and computer program product for navigating a user through a plurality of user interfaces (UIs) of a computing system to perform a task are provided. The computer-implemented method system and computer program product determine, in response to the user accessing the computing system, the task to be performed by the user by evaluating historical data stored therein. Based on the determined task, the plurality of UIs to display to the user is determined, each of the plurality of UIs having at least one menu-option that is to be recommended to the user. Then, in a successive manner, the plurality of UIs is displayed to the user, wherein each successive UI displayed is based on the user choosing a recommended menu-option.

25 Claims, 6 Drawing Sheets

(56) References Cited

U.S. PATENT DOCUMENTS

| | | | | |
|---|---|---|---|---|
| 2007/0150130 | A1* | 6/2007 | Welles | B61L 17/00 701/19 |
| 2007/0168874 | A1* | 7/2007 | Kloeffer | G06F 8/65 715/764 |
| 2010/0191856 | A1* | 7/2010 | Gupta | H04L 29/12066 709/228 |
| 2011/0106736 | A1* | 5/2011 | Aharonson | G06Q 10/109 706/12 |
| 2011/0153343 | A1* | 6/2011 | Tremblay | G06Q 10/06 705/2 |
| 2011/0225183 | A1* | 9/2011 | Rezayat | G06Q 10/10 707/769 |
| 2012/0144423 | A1* | 6/2012 | Kim | H04N 21/482 725/39 |
| 2013/0097052 | A1* | 4/2013 | Dicker | G06Q 30/0633 705/26.7 |
| 2013/0159907 | A1* | 6/2013 | Brosche | G06Q 10/06 715/771 |
| 2013/0238783 | A1* | 9/2013 | Alexander | G06F 16/954 709/224 |
| 2014/0035826 | A1* | 2/2014 | Frazier | G06F 3/0482 345/173 |
| 2015/0012381 | A1* | 1/2015 | Lazaro | G06Q 30/0633 705/26.8 |
| 2016/0098681 | A1* | 4/2016 | Ganis | H04L 63/102 705/301 |
| 2016/0127203 | A1* | 5/2016 | Krishna | G06F 3/0484 715/745 |
| 2016/0197910 | A1* | 7/2016 | Wadhwa | G06F 21/41 726/4 |
| 2016/0209996 | A1* | 7/2016 | Spiegel | G06F 3/04845 |
| 2016/0246840 | A1* | 8/2016 | Masiero | G06F 16/90335 |
| 2016/0259497 | A1* | 9/2016 | Foss | G06F 3/016 |
| 2016/0364094 | A1* | 12/2016 | Shin | H04N 21/466 |
| 2016/0371274 | A1* | 12/2016 | Ng | G06F 16/24578 |
| 2017/0278004 | A1* | 9/2017 | McElhinney | G06Q 10/20 |
| 2017/0285879 | A1* | 10/2017 | Pilkington | G06Q 10/063114 |
| 2018/0004856 | A1* | 1/2018 | Levi | G06F 16/9535 |
| 2018/0113718 | A1* | 4/2018 | Bhamidipati | G06F 9/451 |
| 2018/0164959 | A1* | 6/2018 | Gupta | G06Q 10/109 |
| 2018/0174060 | A1* | 6/2018 | Velez-Rojas | H04W 4/02 |
| 2018/0239500 | A1* | 8/2018 | Allen | G06F 3/0481 |
| 2018/0239959 | A1* | 8/2018 | Bui | G06F 40/103 |
| 2018/0364879 | A1* | 12/2018 | Adam | G06F 3/0484 |
| 2019/0108470 | A1* | 4/2019 | Jain | G06Q 10/20 |
| 2019/0310743 | A1* | 10/2019 | Yamashita | G06N 20/00 |
| 2019/0370710 | A1* | 12/2019 | MacAndog | G06Q 10/06311 |
| 2020/0026397 | A1* | 1/2020 | Wohlstadter | G06F 3/0482 |
| 2020/0065736 | A1* | 2/2020 | Relangi | G06Q 10/0639 |
| 2020/0159862 | A1* | 5/2020 | Kleiner | G06F 3/0482 |

OTHER PUBLICATIONS

Wolfram et al., "What Are You Going to Do Next?" Introducing the Predictive Interface, Dec. 6, 2012, 10 pages, https://blog.stephenwolfram.com/2012/12/what-are-you-going-to-do-next-introducing-the-predictive-interface/.

Schade, "Customization vs. Personalization in the User Experience," Jul. 10, 2016, Nielsen Norman Group, 8 pages, https://www.nngroup.com/articles/customization-personalization/.

Bridle et al., "Predictive Menu Selection on a Mobile Phone," Proceedings of the Workshop W7 on Mining Spatio-Temporal Data, European Conference on Machine Learning, Portugal, Oct. 3-7, 2005, pp. 75-88.

* cited by examiner

| User_ID | User_Role | Main_Menu_ID | Sub_Menu_ID | UI_Item_ID | Workflow_ID | Workflow_Start_Time | Workflow_End_Time | Is_Successful | Error_No |
|---|---|---|---|---|---|---|---|---|---|
| | | | | | | | | | |

| User_Role | Main_Menu_ID | Sub_Menu_ID | UI_Item_ID | Workflow_ID | Workflow_Sequence_No | Avg_Time_To_Complete_The_Workflow | Percentage_Success | Total_Used_Count | Last_Success_Time_Stamp | Last_Failed_Time_Stamp |
|---|---|---|---|---|---|---|---|---|---|---|
| | | | | | | | | | | |

| User_ID | Workflow_ID | Rating | Thumbs_Up_Or_Down | Feedback_Text | Date_Time |
|---|---|---|---|---|---|
| | | | | | |

SYSTEM, METHOD AND COMPUTER PROGRAM PRODUCT OF NAVIGATING USERS THROUGH A COMPLEX COMPUTING SYSTEM TO PERFORM A TASK

BACKGROUND INFORMATION

1. Field

The present disclosure relates generally to an improved computer system, and in particular, to a system, method and computer program product of navigating users through a complex computing system to perform a task. Still more particularly, the present disclosure relates to a dynamic self-learning system that continually learns how users navigate through a complex computing system to arrive at a particular user interface (UI) where a task can be performed. The quickest, most effortless and most successful way of getting to the UI to perform the task is retained by the system such that the system can use it to guide (other) users.

2. Background

Often times, new users of complex computing systems find it hard to navigate the systems without pre-determined in-context help. In-context help, in this case, includes tips in an application that are presented to a user, such as "go there if you are a first time user" or "navigate here and set this up and then go forward" etc. (e.g., a step-by-step flow). Further, returning users, who are not frequent users or power users, at times may find it hard to recollect what they did the last time they were on a system, especially when accessing rarely used features such as setting up dependents for tax purposes in a W-9 Internal Revenue Service (IRS) form, tax set-up, wage garnishments, year-end reports etc. This leads to "HOW TO DO XYZ" sorts of call drivers and results in sub-optimal client experience and loss of time and effort.

Therefore, it would be desirable to have a method and system that take into account at least some of the issues discussed above, as well as other possible issues.

SUMMARY

The present disclosure provides a novel and improved manner for new and/or infrequent users to interact with a complex computing system. According to the disclosure, when a user accesses a computing system incorporating the dynamic self-learning system disclosed herein, the system will non-intrusively and pro-actively guide the user throughout the system such that the user may easily and effortlessly perform any task the user wants to perform on the system. This is especially beneficial to new and/or infrequent users as users need not know beforehand how to navigate the system to arrive at a particular user interface (UI) where a certain task is to be performed.

Further, the dynamic self-learning system is continually figuring out and learning how (experienced) users navigate the system to quickly and effortlessly arrive at particular UIs to perform tasks. The best and most successful way of getting to a UI to perform a particular task is retained by the system such that it can be used to guide/help other users.

Thus, the present disclosure provides an improvement over current manners of interacting with computing systems in general. According to the present disclosure, a computer-implemented method, system and computer program product for navigating a user through a plurality of UIs of a computing system to perform a task, wherein each UI has menu-options thereon from which to access a next UI of the computing system are provided. The computer-implemented method system and computer program product determine, in response to the user accessing the computing system, the task to be performed by the user by evaluating historical data stored therein. The computer-implemented method system and computer program product then determine, based on the determined task, the plurality of UIs to display to the user, each of the plurality of UIs having at least one menu-option thereon that is to be recommended to the user. The computer-implemented method system and computer program product further display, in a successive manner, the plurality of UIs to the user, wherein each successive UI displayed is based on the user choosing a recommended menu-option and recommend, on each displayed UI, the at least one menu-option to the user.

In one or more embodiments, the computer-implemented method system and computer program product determine a role of the user on the computing system as well as whether or not the user is a first time user. If the user is determined to be a first time user, the historical data of previous users of the computing system is used to determine the task to be performed by the user. If the user is determined not to be a first time user, the historical data used is of the user and of other users having a similar role on the computing system as the user. In such a case, one menu-option based on the historical data of the user and another menu-option based on the historical data of the other users are recommended to the user. The two recommended menu-options are differentiated from each other.

The present disclosure also provides a dynamic self-learning system. The dynamic self-learning system includes a context finder module for determining roles of users on the dynamic self-learning system. The dynamic self-learning system also includes a navigation tracker module for capturing sequences of menu traversals of the users as the users are navigating through the dynamic self-learning system to perform a task. The dynamic self-learning system further includes a usage data store for storing the captured sequences of menu traversals, the roles of the users and the tasks performed. In addition, the dynamic self-learning system includes a pattern detector module for periodically analyzing the captured sequences of menu traversals in the usage data store to identify each most frequent and successful menu traversal to perform a task and for co-relating each identified most frequent and successful menu traversal to the role of the user performing the task and to the task. Finally, the dynamic self-learning system uses a usage pattern data store for storing each identified most frequent and successful menu traversal and the co-related role of the user and the task performed by the user.

In one embodiment, when a user accesses the dynamic self-learning system, the dynamic self-learning system determines a role of the user and a task that the user is to perform using the context finder module and determines a menu traversal to use to guide the user through the dynamic self-learning system to perform the determined task, the determined menu traversal is obtained from the usage pattern data store based on the determined role of the user and the determined task that the user is to perform.

In another embodiment, the dynamic self-learning system uses the pattern detector module to increment a successful completion count of an identified most frequent and successful menu traversal stored in the usage pattern data store each time the dynamic self-learning system uses successfully the identified most frequent and successful menu traversal to guide a user through the dynamic self-learning system to perform the co-related task.

In yet another embodiment, when the dynamic self-learning system uses unsuccessfully an identified most frequent and successful menu traversal to guide a user through the self-learning system to perform a co-related task, the dynamic self-learning system uses the pattern detector module to search the usage data store to determine which alternate path other users have successfully used to perform the co-related task and to update the usage pattern data store with the alternate path. In a particular case, the usage pattern data store is updated after the alternate path has been used a threshold number of times.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4c depicts a UsageData table in accordance with an illustrative embodiment;

FIG. 4d depicts a UsagePattern table in accordance with an illustrative embodiment;

FIG. 4e depicts a NavigationRating table in accordance with an illustrative embodiment;

DETAILED DESCRIPTION

The present disclosure describes a system and method that enable a first time/infrequent user of a complex computer system to easily navigate through sets of user interfaces (UIs) to perform a task. In this case, a UI may be a screen, page, document, etc. that may have visual elements such as buttons, icons, actionable items, links, workflow, menus etc. that enable the user to interact with the computer system or communicate with a program running thereon. When the user accesses the system, the system determines whether or not the user is a first time user based on the user's credentials (e.g., log-in information). If the user is a first time user, from each UI on which the user lands, the system will recommend one or more next options (e.g., buttons, icons, actionable items, links, menus etc.) to the user based on options chosen by previous users with similar credentials or access permission information or from previous users in general. The recommendation may be in the form of highlighting some of the options in the UI using bold-faced characters, different colored texts, different background colors, different fonts, different font sizes, or other well-known manners of highlighting texts. If the user is not a first time user, the system will recommend the next options based on the previous choices made by the user. Obviously, the more often the user interacts with the system, the more accurate/precise will the recommendations be.

Thus, the present disclosure provides a dynamic self-learning system that replays actions that a user or a community of users took based on the user's current context in the system. That is, when the user is on a screen, the present disclosure may indicate the option the user chose the last time the user was on that screen and/or indicate the most frequently chosen options by the user or the community of users so as to guide the user proactively. This is especially important for a new user of the system and/or for features or user interfaces that are not frequently used by the user.

Figure 1:
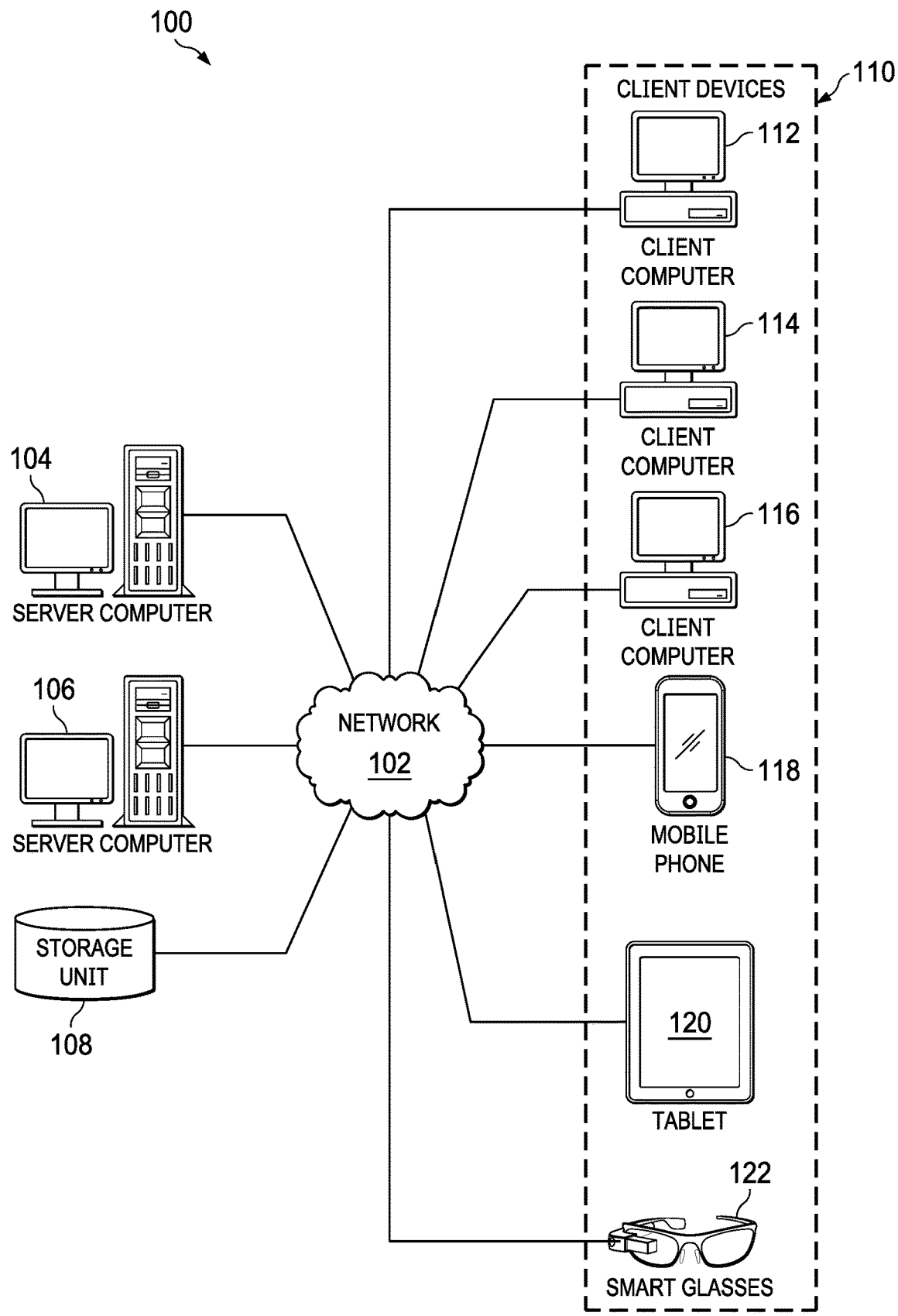
FIG. 1 is a pictorial representation of a network of data processing systems in accordance with an illustrative embodiment.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
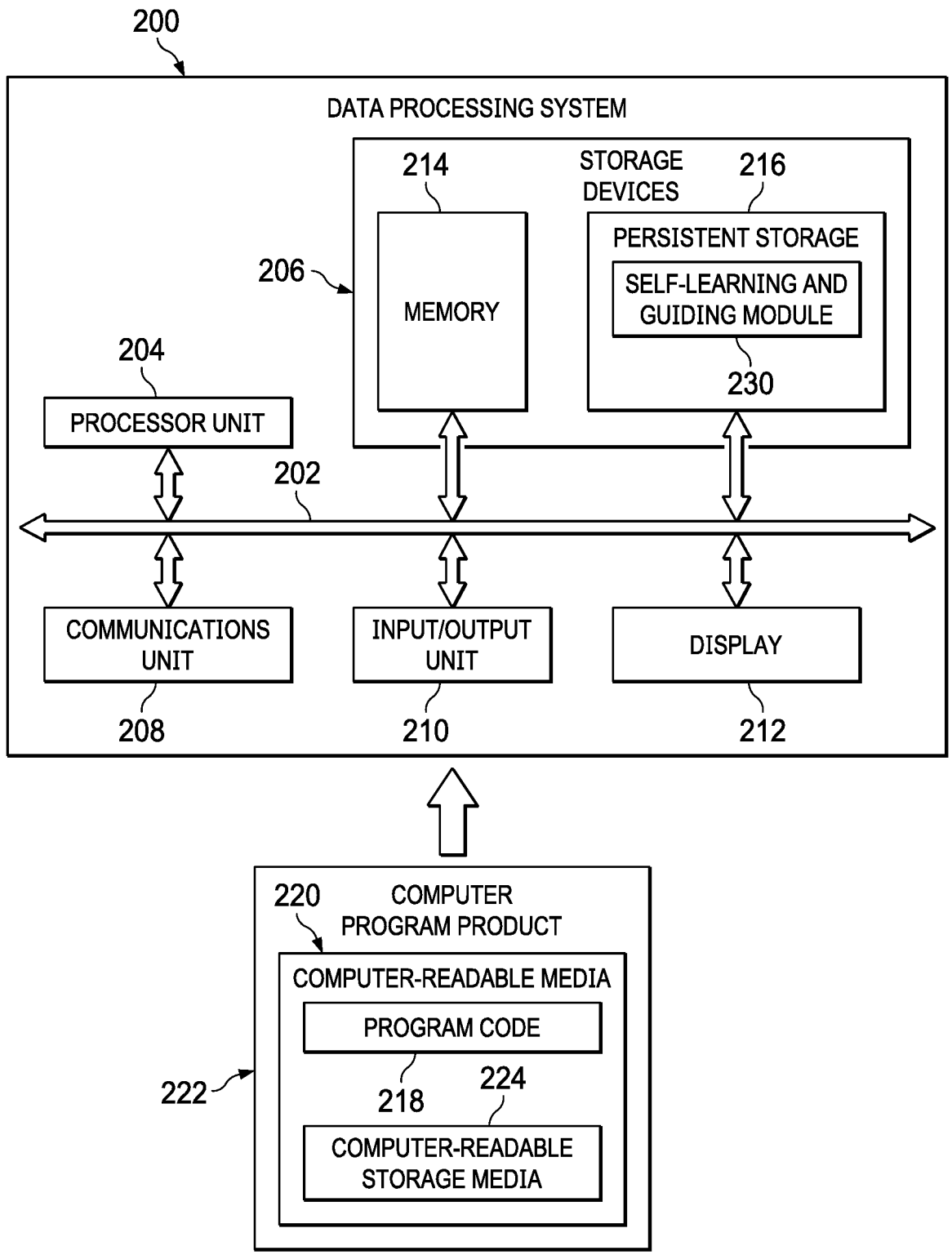
FIG. 2 is a block diagram of a data processing system in accordance with an illustrative embodiment.

Turning now to FIG. 2, a block diagram of a data processing system is depicted in accordance with an illustrative embodiment. Data processing system 200 may be used to implement any of the devices in FIG. 1, except of course for network 102 and storage unit 108. In this illustrative example, data processing system 200 includes communications framework 202, which provides communications between processor unit 204, storage devices 206, communications unit 208, input/output unit 210, and display 212. In this example, communications framework 202 may take the form of a bus system.

Processor unit 204 serves to execute instructions for software that may be loaded into memory 214. Processor unit 204 may be a number of processors, a multi-processor core, or some other type of processor, depending on the particular implementation.

Memory 214 and persistent storage 216 are examples of storage devices 206. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 206 may also be referred to as computer-readable storage devices in these illustrative examples. Memory 214, in these examples, may be, for example, a random-access memory or any other suitable volatile or non-volatile storage device. Persistent storage 216 may take various forms, depending on the particular implementation.

For example, persistent storage 216, which includes self-learning and guiding module 230, may contain one or more components or devices. For example, persistent storage 216 may be a hard drive, a solid-state drive (SSD), a flash memory, a rewritable optical disk, a rewritable magnetic tape, or some combination of the above. The media used by persistent storage 216 also may be removable. For example, a removable hard drive may be used for persistent storage 216.

Communications unit 208, in these illustrative examples, provides for communications with other data processing systems or devices. In these illustrative examples, communications unit 208 is a network interface card.

Input/output unit 210 allows for input and output of data with other devices that may be connected to data processing system 200. For example, input/output unit 210 may provide a connection for user input through at least one of a keyboard, a mouse, or some other suitable input device. Further, input/output unit 210 may send output to a printer. Display 212 provides a mechanism to display information to a user.

Instructions for at least one of the operating system, applications, or programs may be located in storage devices 206, which are in communication with processor unit 204 through communications framework 202. The processes of the different embodiments may be performed by processor unit 204 using computer-implemented instructions, which may be located in a memory, such as memory 214.

These instructions are referred to as program code, computer usable program code, or computer-readable program code that may be read and executed by a processor in processor unit 204. The program code in the different embodiments may be embodied on different physical or computer-readable storage media, such as memory 214 or persistent storage 216.

Program code 218 is located in a functional form on computer-readable media 220 that is selectively removable and may be loaded onto or transferred to data processing system 200 for execution by processor unit 204. Program code 218 and computer-readable media 220 form computer program product 222 in these illustrative examples. In the illustrative example, computer-readable media 220 is computer-readable storage media 224.

In these illustrative examples, computer-readable storage media 224 is a physical or tangible storage device used to store program code 218 rather than a medium that propagates or transmits program code 218.

Alternatively, program code 218 may be transferred to data processing system 200 using a computer-readable signal media. The computer-readable signal media may be, for example, a propagated data signal containing program code 218. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code 218.

Note that, many of the functional units that will be described in this disclosure are labeled as modules in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like. Further, modules may also be implemented in software for execution by various types of processors.

According to the present disclosure, a user using any of the devices in client devices 110 of FIG. 1 may log onto server 104 and/or 106 to use an application running thereon. If the server the user is logged onto includes a self-learning and guiding module 230 as shown in FIG. 2, then the server (or device) may be represented by system 200. System 200 may guide the user as to the steps the user needs to take to perform a task.

Generally, system 200 will know the context in which the user is interacting with the system (e.g., whether the user is a recruiter, an employee, a manager etc.) through the user log-in information and/or credentials. If the user is a recruiter, for example, and usually creates a requisition form while on the system or if the first and only time the user was on the system the user created a requisition form, the system will guide the user on the steps the user needs to take to create a requisition form. If the user is using the system for the very first time, then the system may check how other recruiters have navigated through the system and provide the guidance learned from those interactions to the user.

But note that, if the user/recruiter is logging onto the system for the first time, as alluded to in the previous paragraph, the system will know that the user is a first time user. Accordingly, the system may highlight the options that first time users in general have chosen before guiding the first time user/recruiter through the tasks in which most recruiters have engaged.

For example, if the first task that most first time users have engaged in is a profile set up or a change of passwords, the system will highlight those options that will enable the first time user/recruiter to do a profile set up or a change of passwords. When this is done, the system may suggest the next mostly performed task that first time users have done by recommending the appropriate options. Once the system has guided the first time user/recruiter through all the tasks that first time users usually engaged in, the system may then guide the first time user/recruiter through the tasks in which most recruiters have engaged.

In some instances, a user may not follow the system's recommendations. That is, the user may choose options that the system did not recommend (i.e., choose an alternate path). For example, after the profile setup, the first time user/recruiter may not choose to follow the system's further recommendations since they may relate to first time users in general. The option taken by the user/recruiter, which was not recommended by the system (i.e., the alternate path), might have been chosen by other users and thus there may be some information for that alternate path stored into the system. The system will then recommend the most commonly used menu items in that alternate path.

It is worth noting that everything will be tied to a workflow based on what the user is trying to do. For example, if the user/recruiter is trying to contact a candidate or send an offer letter to a prospective employee, the system may capture this context. Based on the captured context, the system will infer the task being performed by the user. Again, the system knows the role of the user based on the user's log-in information (i.e., whether the user is a practitioner, a manager, a recruiter, employee, or a supervisor and so on). Based on this information, the system can anticipate what the user may want to do. Once the user has gone to a specific access path (i.e., user wants to contact a candidate), which was anticipated by the system, and then the user switches paths (i.e., the user cancels the path or selects an alternate path such as sending an offer letter to a prospective employee) the system may infer that the path was not successful.

When the user selects the alternate path, the system will check whether any other recruiter has gone through that alternate path (i.e., the system will check to see whether such pattern is there in the system). If there is no such pattern in the system (i.e., no recruiters have sent offer letters to prospective employees), then the system will go with seeded metadata (metadata that was generated during the setup of the system). That is, to generate an offer letter, a user needs to do these steps (i.e., navigate to screen1, then screen2, then screen3 etc., to access these particular menus etc. in this order). But, if there is such pattern in the system, then the system will determine what other recruiters have done and will suggest that particular pattern (i.e., see the list of candidates, send offer letters, or do a batch of sending offer letters or whatever common steps have been taken by other recruiters).

In sum, the system will non-intrusively and progressively guide a user on the steps to take to complete a task and/or process (i.e., a workflow). To be able to do so, the system continually captures data in real-time (i.e., as a user is interacting with the system). Further, the system also performs computations of likelihood of success of paths being taken by users on a consistent basis (i.e., in real-time but most often at night through batch processing).

Figures 3, 4A, 4B:
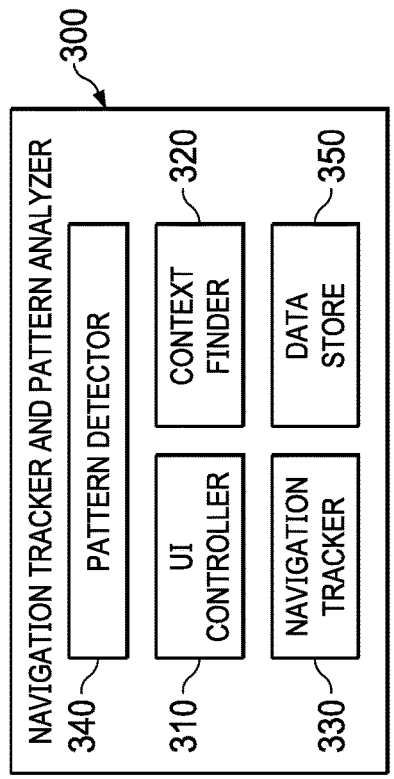
FIG. 3 is a block diagram of a navigation tracker and pattern analyzer in accordance with an illustrative embodiment.
FIG. 4a depicts a LoginData table in accordance with an illustrative embodiment.
FIG. 4b depicts a MetaData table in accordance with an illustrative embodiment.

Turning now to FIG. 3, a block diagram of a navigation tracker and pattern analyzer 300 used by self-learning and guiding module 230 of FIG. 2 is depicted in accordance with an illustrative embodiment. Navigation tracker and pattern analyzer 300 includes user interface (UI) controller module 310, context finder module 320, navigation tracker module 330, pattern detector module 340, and data store 350.

As the name suggests, UI controller module 310 controls the UI, which is the space where interactions between humans and machines occur. Thus, UI controller module 310 may provide the screen that is to be displayed to the user as well as passes to the system the menu items chosen by the user.

Context finder module 320 looks up metadata to determine the current user context based on the page being displayed to the user.

Navigation tracker module 330 captures the sequence of menu traversals and screen shots for an activity/workflow. Specifically, using the successive screens' IDs being provided to navigation tracker module 330 by context finder module 320 while a user is performing an activity, navigation tracker module 330 may reproduce the user's menu traversals. The menu traversals as well as whether or not the activity the user was engaged in, as inferred by the system, was successful may then be stored in data store 350.

As an example, let us suppose that for some particular reason (i.e., a bug in the system, data corruption etc.) a particular flow is not going to completion and thus is not successful, then if it is the first time that has happened, navigation tracker module 330 may not know whether or not it is successful. But, navigation tracker module 330 will continuously track the users' actions i.e., the combinations of steps a user is going through until finally the user arrives at the end of the particular flow (i.e., a successful resolution). Navigation tracker module 330 will track the number of times that particular flow is used successfully until it reaches a threshold (i.e., maybe 20 users have to be successful using this particular path for navigation tracker module 330 to determine that this is a successful path). If the threshold is met, then navigation tracker module 330 will make a note that this alternate navigation has been successful when the primary one was not for the particular workflow. So, the system will not suggest the primary navigation path to succeeding users, but rather the alternate one that was successful. In sum, the system will have all the workflows that users use whether successful or not. The workflows may be stored in tables that are in data store 350.

Pattern detector module 340 is used to identify the most frequent and successful traversal (i.e., data save/retrieval/workflow completion) made in an access hierarchy for successful actions and co-relates the identified traversal to the context in which the user is in. Thus, on a periodic basis, pattern detector module 340 accesses tables stored in data store 350 to identify most frequent and successful traversals and to co-relate the traversals to appropriate contexts. The identified traversals as well as the correlated contexts are stored in appropriate tables for later use.

Data store 350 may contain a plurality of tables. As an example, data store 350 may contain a LoginData table, a MetaData table, a UsageData table, a UsagePattern table, and a NavigationRating table.

FIG. 4a depicts LoginData table in accordance with an illustrative embodiment. LoginData table 400a includes columns for User_Id, User_Role, Login_Date_Time, and a Logout_Date_Time. A User_Role may be payroll practitioner, benefits administrator, manager, shift supervisor, recruiter, employee, candidate applying for a job etc. Thus, LoginData table 400a may enable system 200 to track user logins and user roles. In addition, LoginData table 400a may enable system 200 to determine whether or not a user is a first-time user. If the user is not a first-time user, LoginData 400a table may further enable system 200 to determine whether or not the user has not accessed system 200 for a very long time. Note that, a first time user and/or a user that has not accessed system 200 in a long time may need to be guided through system 200. Note further that, a user role (as well as access privileges) may be determined from LDAP (lightweight directory access protocol) and role management setup. LDAP is an application that stores user credentials in a network security system, which may be retrieved with a user password and decrypted key giving access to services.

FIG. 4b depicts MetaData table in accordance with an illustrative embodiment. MetaData table 400b is a seeded table which is setup as part of system 200 configuration to guide first time users in accordance with their role until a critical mass of the usage data is collected in system 200. MetaData table 400b will have a sequence of UI actions to be taken to accomplish each pre-defined workflow in system 200. Further, MetaData table 400b may identify main menu access points and navigation steps of all sub-menus/tabs and buttons in completing a pre-defined workflow. MetaData table 400b may include a User_Role, a Main_Menu_Id, a Sub_Menu_Id, a UI_Item_Id (button or any other UI control), a Workflow_Id, a Workflow_Name, a Workflow_Sequence_No, a Total_Steps_In_Workflow, and a Screen_Image (i.e., binary large object (BLOB) data to display the sample miniature screen shot) columns. The Workflow_Sequence_No denotes the order in which the workflow steps need to be performed in terms of the system navigation flow.

FIG. 4c depicts UsageData table in accordance with an illustrative embodiment. UsageData table 400c contains usage data collected across system 200 to guide new users to a specific feature set as well as to keep track of erroneous flows to that feature set and also successes of that workflow. UsageData 400c also tracks the persona/role of the user for which the usage data is being tracked. UsageData 400c may contain a User_Id, User_Role, Main_Menu_Id, Sub_Menu_Id, UI_Item_Id (button/any other UI control), Workflow_Id (nullable), Workflow_Start_Time, Workflow_End_Time, Is_Successful (True/False), Error_No (In case of failure). If the workflow was retried and it was successful, UsageData 400c may contain another row with the same User_Id, User_Role, Main_Menu_Id, Sub_Menu_Id, UI_Item_Id and different Workflow End Time and Is_Successful as T.

FIG. 4d depicts UsagePattern table in accordance with an illustrative embodiment. UsagePattern table 400d contains derived data per user role/persona. A batch process parses the data in UsageData table 400c very few hours and applies analytical techniques to identify repeating and frequent patterns and updates UsagePattern table 400d dynamically to identify the most used and successful workflows (for a given user role). If there are frequent errors encountered in specific workflows they are flagged to forewarn users and guide them to an alternate one if one was identified when the data is parsed and is determined to be successful for a critical threshold limit of use. The columns of UsagePattern 400d may include a User_Role, Main_Menu_Id, Sub_Menu_Id, UI_Item_Id (button/any other UI control), Workflow_Id (Not nullable as pattern analyzer will identify the workflow to which this belongs), Workflow_Sequence_No, Avg_Time_To_Complete_The_Workflow, Percentage_Success, Total_Used_Count, Last_Success_Time_Stamp, Last_Failed_Time_Stamp. The Percentage_Success column will indicate how many times this workflow has been successful and Total_Used_Count indicates the total number of invocations of this workflow.

FIG. 4e depicts a NavigationRating table in accordance with an illustrative embodiment. NavigationRating table 400e captures user rating feedback on the navigation tips being proactively shown by system 200. The user can give either a rating or a thumbs up/down for a specific workflow's navigation tip. This information in conjunction with the UsagePattern analytics data will be used to determine whether a particular workflow's navigation tip will be displayed or not (e.g., if there are majority low ratings for a specific workflow's navigation tips, it will not be recommended unless the system administrator annuls it manually). The columns of NavigationRating table 400e may include User_Id, Workflow_Id, Rating (1 star to 5 stars), Thumbs_Up_Or_Down, Feedback_Text, Date_Time.

Figure 5:
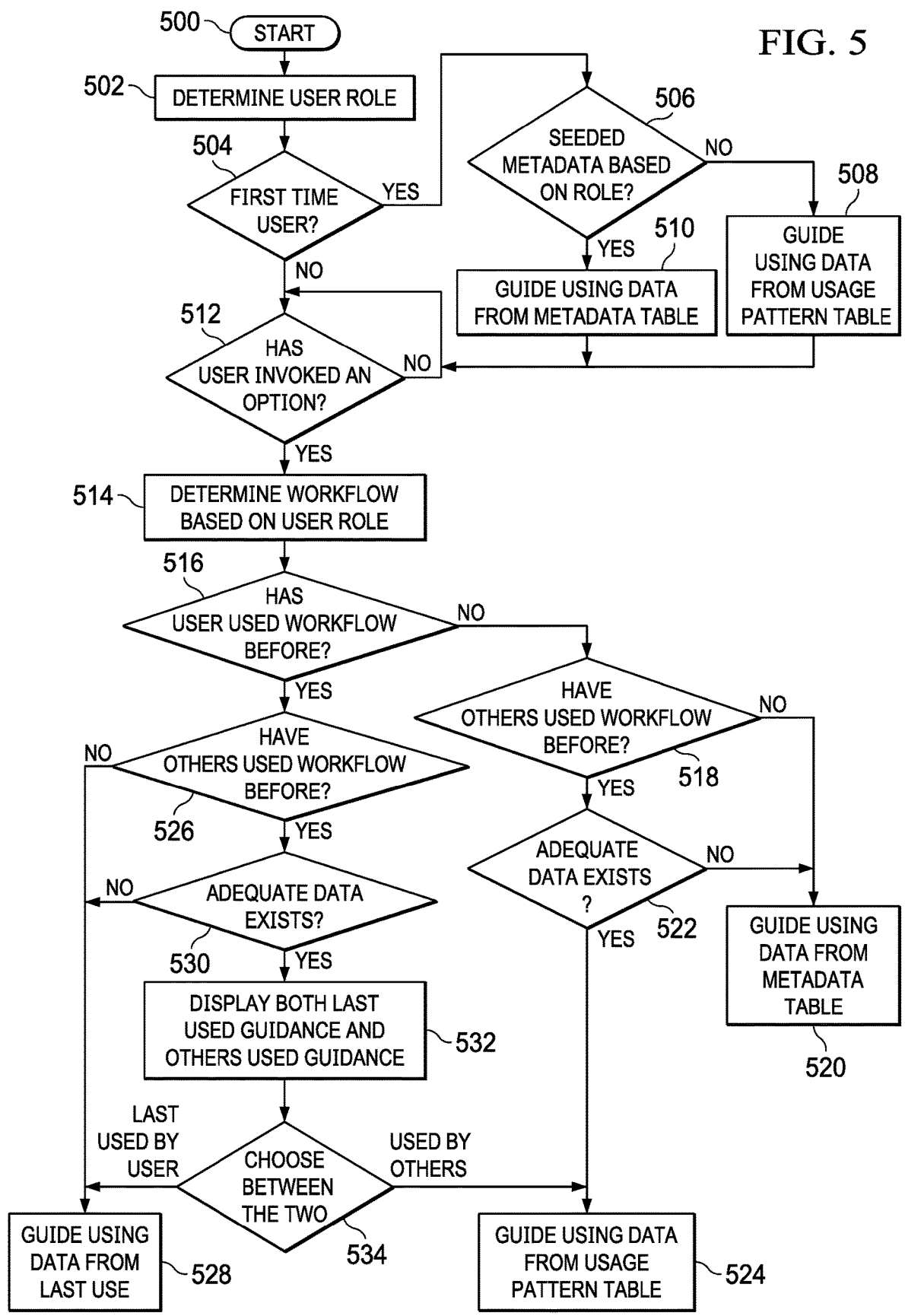
FIG. 5 depicts a flowchart of a process that may be used when navigating a user in accordance with an illustrative embodiment.

FIG. 5 depicts a flowchart of a process that may be used by system 200 when guiding a user in accordance with an illustrative embodiment. The process starts when the user logs onto system 200 (block 500). At that point, system 200 determines the user's role in system 200 (block 502) and checks to see whether or not the user is a first time user (block 504). To get such information, system 200 may use context finder 320 in FIG. 3 to access LoginData table 400a. In any event, if the user is a first time user, the process may again use context finder 320 to access MetaData table 400b to determine whether seeded metadata exists therein for the user's role (block 506). If so, system 200 will guide the user using the seeded metadata from MetaData table 400b (block 510). If there is no seeded metadata in MetaData table 400b for that specific role (a very unlikely scenario), system 200 may use usage pattern analyzed data in UsagePattern table 400d to provide a guided process with first-time use navigation tips to the user (block 508). In such a case, the flow that is the most used by first-time users will be used. After guiding the user using first-time use navigation tips (whether from seeded metadata or usage pattern data), the process may jump to block 512 to wait for the user to invoke a function.

Returning to block 504, if the user is not a first time user, system 200 may check to see whether the user has invoked a specific option in main menu (block 512). If not, system 200 will wait until the user does so. If the user has invoked an option, system 200 will try to determine the workflow the user may want to engage in (block 514) and check to see whether the user has used the determined workflow before (block 516). To do so, system 200 may use context finder module 320 to access data in UsagePattern table 400d. If the user has not used the determined workflow before, system 200 may determine whether other users have (block 518). If no other users have used the workflow before, system 200 may guide the user using data from Metadata table 400b (block 520). If, on the other hand, others have used the workflow before, system 200 may check to see whether there is adequate data to make a recommendation on the navigation flow based on a threshold usage limit that may have been set for that workflow to come up in recommendations (block 522). If adequate data does not exist (i.e., there is not enough data captured from multiple users in that role) the process may jump to block 520 where system 200 may guide the user using data from Metadata table 400b. If there is enough data captured from multiple users in that role across multiple days and it meets the threshold limit for displaying recommendations, the system will display the guided navigation tips to the user using data from UsagePattern table 400d (block 524).

Returning to block 516, if the user has used the determined workflow before, system 200 may determine whether other users have also used the determined workflow (block 526). If other users have not also used the determined workflow, system 200 may guide the user using the last navigation path used by the user (block 528). But, if other users have also used the determined workflow, system 200 may check to see whether there is adequate data to make a recommendation on the navigation flow based on the threshold usage limit that may have been set for that workflow (block 530). If adequate data does not exist, the process may jump to block 528 where system 200 may guide the user using the last navigation path used by the user. If adequate data does exist, system 200 may display visual cues to the user regarding both the last navigation path used by the user and the most used navigation path by other users (block 532) so that the user may indicate to the system 200 how the user wishes to be guided. The visual cues may be through different colors or different highlighting intensities etc. or system 200 may plainly inform the user that one flow is the user's last used flow and the other flow is one that has been used the most by other users in a similar role as the user). System 200 may check to see whether the user has chosen the flow last used by the user or the flow mostly used by others (block 534). If the user has chosen the flow last used by the user, the process may jump to block 528, otherwise the process may jump to block 524. The process will end when the user logs off the system.

Obviously, a guided flow may progress to a successful completion or may fail to complete successfully. When a guided flow arrives at a successful completion, system 200 may use pattern detector module 340 of FIG. 3 to increment the workflow successful completion counts for that navigation path in UsagePattern table 400d. If the guidance did not lead to a successful completion, system 200 may search UsagePattern table 400d to determine how other users have recovered from that failure (i.e., which alternate paths they had used (within a reasonable timeframe) to complete the workflow. System 200 is able to do so by keeping track of errors and sequence of UI actions/steps taken by users to overcome the error (i.e., whether subsequent sets of actions taken by users resulted in the workflow being successfully completed or whether the workflow was terminated and a new/alternate workflow was used etc.). In short, using navigation tracker module 330 of FIG. 3, system 200 keeps track of all user actions within the context of the workflow and when the workflow ends in an error, system 200 finds out which other next workflow was selected by the user as a result. The steps that other users took to recover from the failure will be used as guidance for the current user when the same error is encountered.

To help with the accuracy of system 200, users may rate the navigation tips received from system 200. The rating may be on a scale of one (1) to five (5) or a thumbs up or down and entered into NavigationRating table 400e. To submit the rating, a user may right click the navigation tip. This qualitative information may be used along with the usage metrics by pattern analyzer to come up with navigation recommendations. If there are many low ratings/thumbs down for a specific workflow's navigation, the system administrator may use this information to contact users and/or do a deeper user research analysis.

Figure 6:
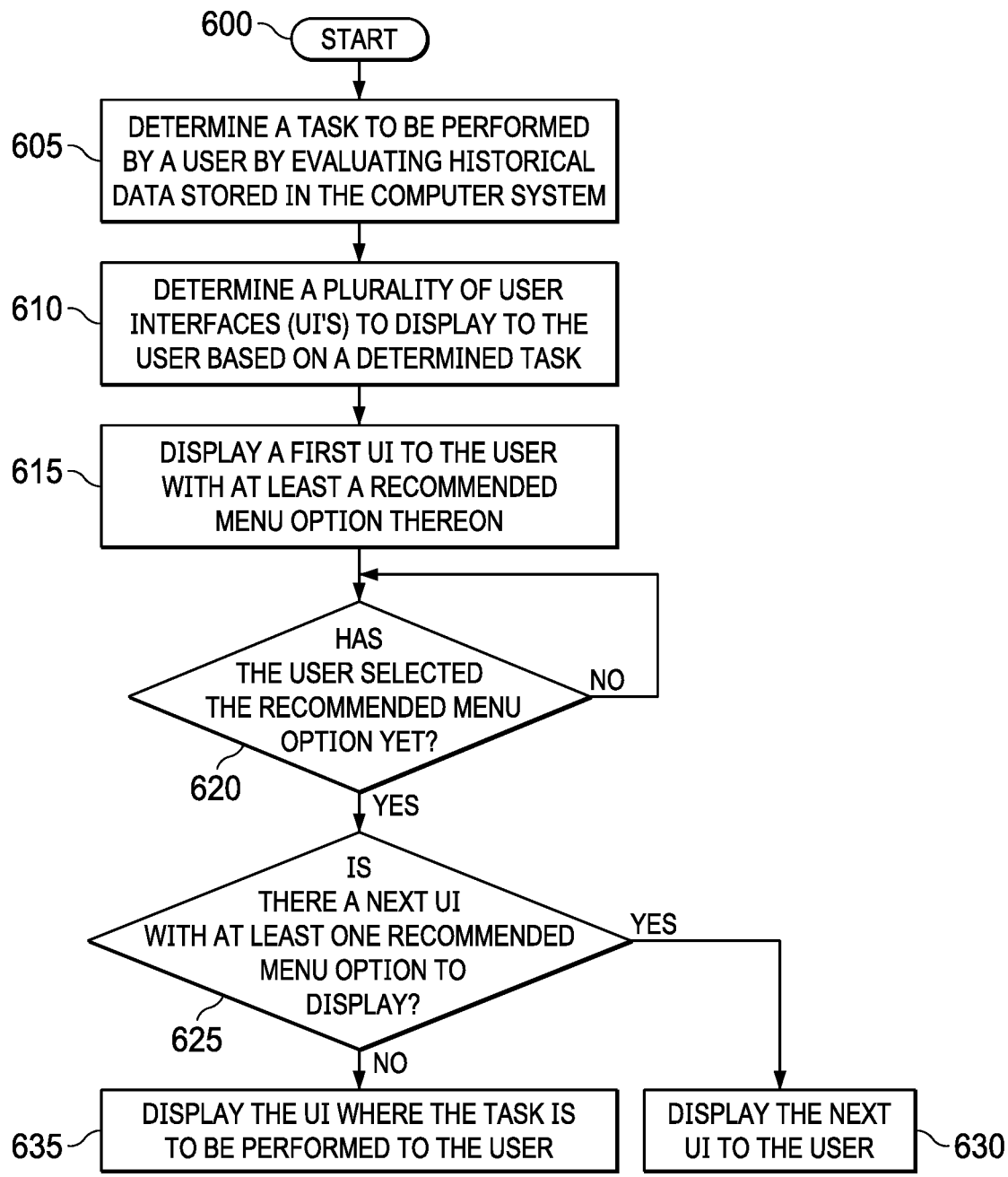
FIG. 6 depicts a flowchart of an alternate process that may be used when navigating a user in accordance with an illustrative embodiment.

FIG. 6 depicts a flowchart of an alternate process that may be used by system 200 when guiding a user in accordance with an illustrative embodiment. The process starts when the user logs onto system 200 (block 600). At that point, system 200 determines the task to be performed by the user by evaluating historical data stored in system 200 (block 605) and determines a plurality of UIs to display to the user based on the determined task (block 610). After determining the plurality of UIs to display to the user, system 200 displays the first UI with at least one recommended menu-option thereon (block 615). System 200 then checks to determine whether the user has selected the at least one recommended menu-option (block 620). If the user has not selected the at least one recommended menu-option yet, system 200 waits until the user does so. When the user does select the at least one recommended menu-option, system 200 checks to see if there is at least one more UI with at least one recommended menu-option to display to the user (block 625). If so, system 200 displays the next UI to the user (block 635) and jumps back to block 620. If not, then system 200 displays the UI where the task is to be performed to the user (block 635). The process ends when the user logs off the system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described.

For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of navigating through a plurality of user interfaces (UIs) of a computing system while performing a task, the computer-implemented method comprising:
    each UI in the plurality of UIs providing, respectively, menu-options for accessing a next UI of the computing system;
    determining, responding to a role indicated by the computing system receiving log-in credentials and evaluating historical data related to the role, a determined task to be performed on the computing system;
    determining, using the determined task and menu selections from prior log-ins, a sequence of UIs from the plurality of UIs from a metadata table based on pre-defined a workflow determined by historical user data for the determined task, such that each UI of the sequence of UIs displays at least one recommended menu-option as highlighted, wherein each recommended menu-option displayed on each UI of the sequence of UIs is configured to have access to the next UI from the sequence of UIs;
    after determining the sequence of UIs from the plurality of UIs, displaying a first UI with the at least one recommended option in the sequence of UIs from the plurality of UIs;
    successively displaying respective UIs in the sequence of UIs in response to user selection of any recommended menu-option in each UI of the sequence of UIs until there are no more display of UIs in the sequence of UIs with recommended menu-options; and
    after determining that there are no more display of UIs in the sequence of UIs with recommended menu-options, displaying a separate UI where the determined task is to be performed by a user on the computing system.

2. The computer-implemented method of claim 1, wherein determining the determined task comprises evaluating historical data related to a user on the computing system.

3. The computer-implemented method of claim 2, wherein determining the determined task further includes determining whether or not the user is a first time user.

4. The computer-implemented method of claim 3, wherein if the user is determined to be the first time user, the historical data is of previous users of the computing system.

5. The computer-implemented method of claim 4, wherein the previous users include users with similar credentials to the user.

6. The computer-implemented method of claim 5, wherein credentials include access permission.

7. The computer-implemented method of claim 3, wherein if the user is determined not to be the first time user, the historical data is of the user and of other users having a similar role on the computing system as the user.

8. The computer-implemented method of claim 7, wherein the at least one recommended menu-option comprises a menu-option based on the historical data of the user and a menu-option based on the historical data of the other users.

9. The computer-implemented method of claim 8, wherein the menu-option based on the historical data of the user is differentiated from the menu-option based on the historical data of the other users.

10. A computing system configured to navigate through a plurality of user interfaces (UIs) of the computing system to perform a task, such that the computer system comprises:
    at least one storage device configured to store program code; and
    at least one processor configured to process the program code to:
        determine, based on a role indicated by log-in credentials and historical data related to the role, a determined task to be performed on the computer system;
        determine, based on the determined task and menu selections from prior log-ins, a sequence of UIs from the plurality of UIs from a metadata table based on pre-defined workflow determined by historical user data for the determined task, such that each UI of the sequence of UIs displays at least one recommended menu-option as highlighted, wherein each recommended menu-option displayed on each UI of the sequence of UIs is configured to have access to the next UI from the sequence of UIs;
        after determining the sequence of UIs from the plurality of UIs, displaying a first UI with the at least one recommended option in the sequence of UIs from the plurality of UIs;
        successively displaying respective UIs in the sequence of UIs in response to user selection of any recommended menu-option in each UI of the sequence of UIs until there are no more display of UIs in the sequence of UIs with recommended menu-options; and
        after determining that there are no more display of UIs in the sequence of UIs with recommended menu-options, displaying a separate UI where the determined task is to be performed by a user on the computing system.

11. The computing system of claim 10, wherein determining the determined task includes evaluating historical data related to a user on the computing system.

12. The computing system of claim 11, wherein determining the determined task further includes determining whether or not the user is a first time user.

13. The computing system of claim 12, wherein if the user is determined to be the first time user, the historical data is of previous users of the computing system.

14. The computing system of claim 13, wherein the previous users include users with similar credentials to the user.

15. The computing system of claim 12, wherein if the user is determined not to be the first time user, the historical data is of the user and of other users having a similar role on the computing system as the user.

16. The computing system of claim 15, wherein the at least one recommended menu-option comprises a menu-option based on the historical data of the user and a menu-option based on the historical data of the other users.

17. The computing system of claim 16, wherein the menu-option based on the historical data of the user is differentiated from the menu-option based on the historical data of the other users.

18. A computer program product configured to navigate through a plurality of user interfaces (UIs) of a computing system to perform a task, each UI having menu-options thereon from which to access a next UI of the computing system, the computer program product comprising:
   a computer-readable hardware storage medium that comprises computer-readable program code embodied therewith configured to execute on the computing system, the computer-readable program code configured to:
      determine, based on a role indicated by log-in credentials and historical data related to the role, a determined task to be performed on the computing system;
      determine, based on the determined task and menu selections from prior log-ins, a sequence of UIs from the plurality of UIs from a metadata table based on pre-defined workflow determined by historical user data for the determined task, such that each of the sequence of UIs displays at least one recommended menu-option as highlighted, wherein each recommended menu-option displayed on each UI of the sequence of UIs is configured to have access to the next UI from the sequence of UIs;
      after determining the sequence of UIs from the plurality of UIs, displaying a first UI with the at least one recommended option in the sequence of UIs from the plurality of UIs;
      successively displaying respective UIs in the sequence of UIs in response to user selection of any recommended menu-option in each UI of the sequence of UIs until there are no more display of UIs in the sequence of UIs with recommended menu-options; and
      after determining that there are no more display of UIs in the sequence of UIs with recommended menu-options, displaying a separate UI where the determined task is to be performed by a user on the computing system.

19. The computer program product of claim 18, wherein determining the determined task includes evaluating historical data related to a user on the computing system.

20. The computer program product of claim 19, wherein determining the task to be performed by the user further includes determining whether or not the user is a first time user.

21. The computer program product of claim 20, wherein if the user is determined to be the first time user, the historical data is of previous users of the computing system.

22. The computer program product of claim 21, wherein the previous users include users with similar credentials to the user.

23. The computer program product of claim 20, wherein if the user is determined not to be the first time user, the historical data is of the user and of other users having a similar role on the computing system as the user.

24. The computer program product of claim 23, wherein the at least one recommended menu-option comprises a menu-option based on the historical data of the user and a menu-option based on the historical data of the other users.

25. The computer program product of claim 24, wherein the menu-option based on the historical data is differentiated from the menu-option based on historical data for other log-in credentials.

* * * * *